(12) United States Patent
Koudar et al.

(10) Patent No.: US 12,085,649 B2
(45) Date of Patent: Sep. 10, 2024

(54) IMAGING SYSTEMS WITH SINGLE-PHOTON AVALANCHE DIODES AND AMBIENT LIGHT LEVEL DETECTION

(71) Applicant: SEMICONDUCTOR COMPONENTS INDUSTRIES, LLC, Phoenix, AZ (US)

(72) Inventors: Ivan Koudar, Modrice (CZ); Jan Ledvina, Tovacov (CZ)

(73) Assignee: SEMICONDUCTOR COMPONENTS INDUSTRIES, LLC, Scottsdale, AZ (US)

(*) Notice: Subject to any disclaimer, the term of this patent is extended or adjusted under 35 U.S.C. 154(b) by 612 days.

(21) Appl. No.: 16/948,269

(22) Filed: Sep. 10, 2020

(65) Prior Publication Data

US 2021/0223398 A1 Jul. 22, 2021

Related U.S. Application Data

(60) Provisional application No. 62/963,648, filed on Jan. 21, 2020.

(51) Int. Cl.
*G01S 17/89* (2020.01)
*G01S 7/4863* (2020.01)
*G01S 17/14* (2020.01)

(52) U.S. Cl.
CPC ............ *G01S 17/89* (2013.01); *G01S 7/4863* (2013.01); *G01S 17/14* (2020.01)

(58) Field of Classification Search
CPC ......... G01S 17/14; G01S 7/4863; G01S 17/89
USPC ...................................................... 356/4.01
See application file for complete search history.

(56) References Cited

U.S. PATENT DOCUMENTS

| 2018/0123611 | A1* | 5/2018 | Dutton | G01S 17/10 |
| 2018/0364340 | A1* | 12/2018 | Ichiyanagi | G01S 7/4814 |
| 2019/0056497 | A1* | 2/2019 | Pacala | G01S 7/4863 |
| 2020/0182983 | A1* | 6/2020 | Calder | G01S 7/4865 |
| 2020/0341144 | A1* | 10/2020 | Pacala | G01S 17/931 |

(Continued)

OTHER PUBLICATIONS

Gnechhi et al., "A 1×16 SiPM Array for Automotive 3D Imaging LiDAR Systems"; International Image Sensor Society, Index of Past Workshops. 2017.

(Continued)

*Primary Examiner* — Hovhannes Baghdasaryan
(74) *Attorney, Agent, or Firm* — Treyz Law Group, P.C.; Joseph F. Guihan

(57) ABSTRACT

A light detection and ranging (LIDAR) imaging system may include a semiconductor device based on single-photon avalanche diodes (SPADs). The LIDAR imaging system may also include a light source configured to emit light such that the semiconductor device is exposed to both ambient light and a reflected version of the laser light. Ambient light level detection circuitry may be included to determine a brightness of the ambient light based on an output signal from the semiconductor device. The ambient light level detection circuitry may include a plurality of comparators that receive different reference signals and are coupled to respective counters. The results from the counters may be used to determine the brightness of the ambient light in the scene. The determined brightness may then be used to discriminate between the ambient light and the reflected version of the light.

19 Claims, 9 Drawing Sheets

(56) References Cited

U.S. PATENT DOCUMENTS

2021/0173053 A1\* 6/2021 Tsai .................... G01S 17/933

OTHER PUBLICATIONS

Frenske et al., "DLP DMD Technology: LIDAR ambient light reduction"; White Paper, DLPA093—Sep. 2018.
Johansen et al., "Thin-Film Interference Filters for LIDAR"; Alluxa White Paper Series. 2017.

\* cited by examiner

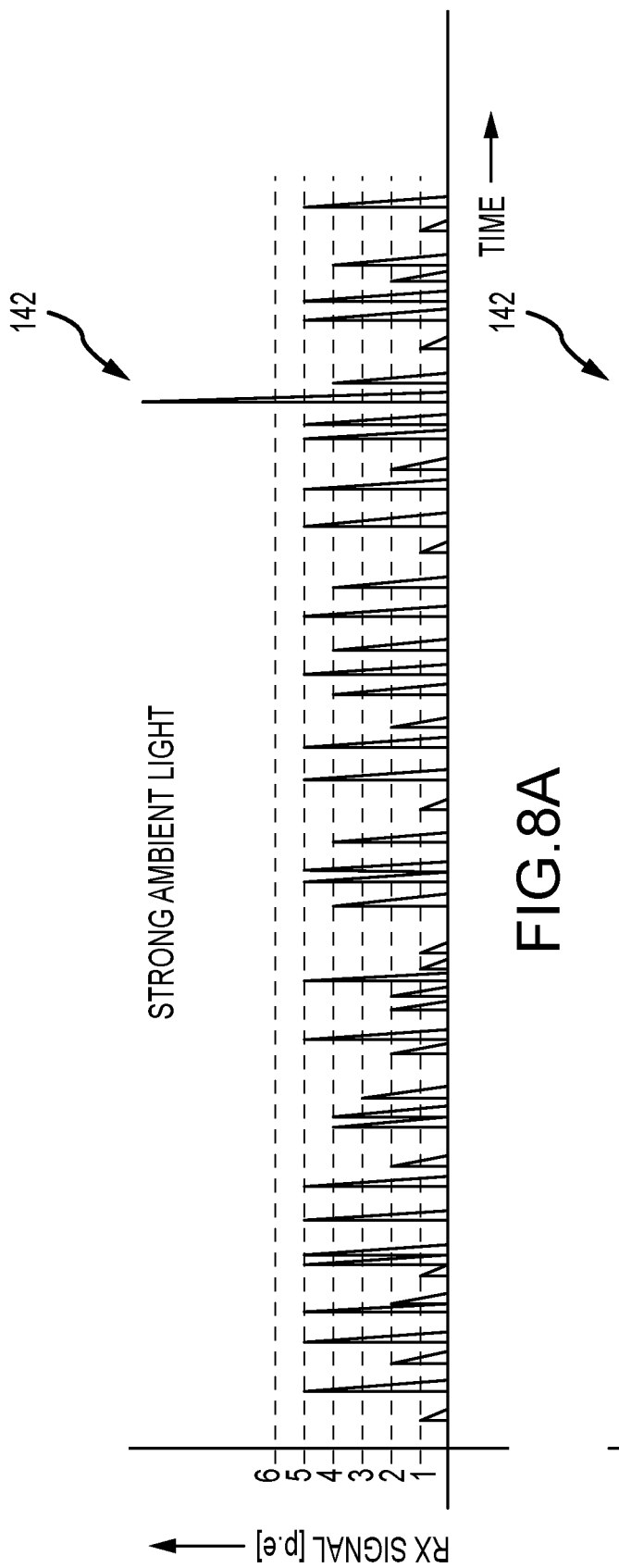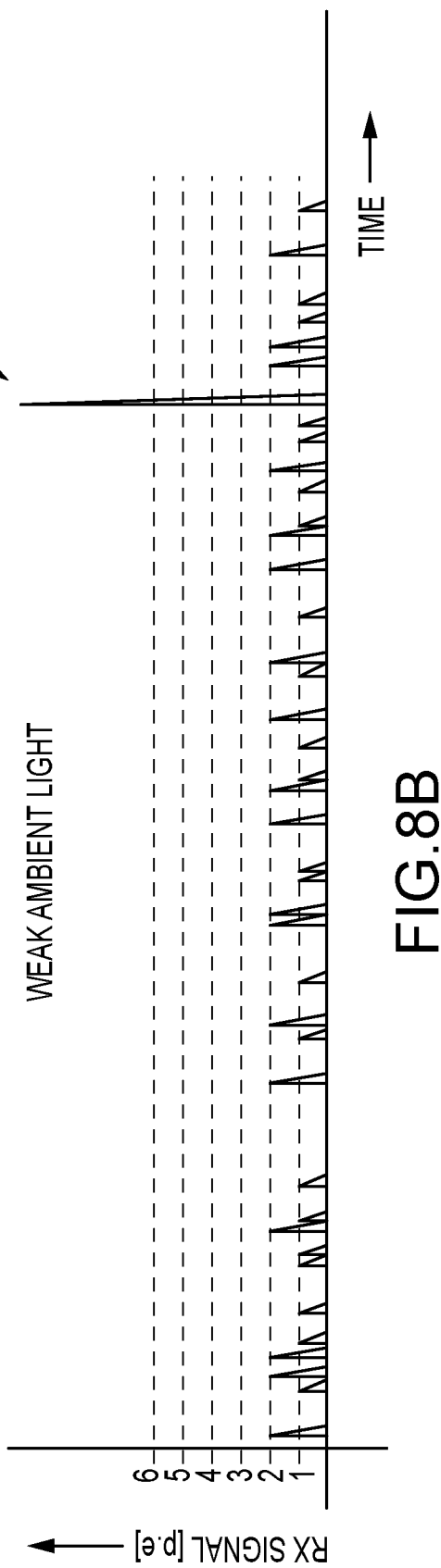
FIG.8A
FIG.8B

IMAGING SYSTEMS WITH SINGLE-PHOTON AVALANCHE DIODES AND AMBIENT LIGHT LEVEL DETECTION

This application claims the benefit of provisional patent application No. 62/963,648, filed Jan. 21, 2020, which is hereby incorporated by reference herein in its entirety.

BACKGROUND

This relates generally to imaging systems and, more particularly, to imaging systems that include single-photon avalanche diodes (SPADs) for single photon detection.

Modern electronic devices such as cellular telephones, cameras, and computers often use digital image sensors. Image sensors (sometimes referred to as imagers) may be formed from a two-dimensional array of image sensing pixels. Each pixel typically includes a photosensitive element (such as a photodiode) that receives incident photons (light) and converts the photons into electrical signals.

Conventional image sensors may suffer from limited functionality in a variety of ways. For example, some conventional image sensors may not be able to determine the distance from the image sensor to the objects that are being imaged. Conventional image sensors may also have lower than desired image quality and resolution.

To improve sensitivity to incident light, single-photon avalanche diodes (SPADs) may sometimes be used in imaging systems. Single-photon avalanche diodes may be capable of single-photon detection.

It is within this context that the embodiments described herein arise.

BRIEF DESCRIPTION OF THE DRAWINGS

FIGS. 8A and 8B are graphs showing a signal from a SPAD-based semiconductor device over time in strong and weak ambient light conditions respectively in accordance with an embodiment.

DETAILED DESCRIPTION

Embodiments of the present invention relate to imaging systems that include a silicon photomultiplier (SiPM) based sensor.

Some imaging systems include image sensors that sense light by converting impinging photons into electrons or holes that are integrated (collected) in pixel photodiodes within the sensor array. After completion of an integration cycle, collected charge is converted into a voltage, which is supplied to the output terminals of the sensor. In complementary metal-oxide semiconductor (CMOS) image sensors, the charge to voltage conversion is accomplished directly in the pixels themselves, and the analog pixel voltage is transferred to the output terminals through various pixel addressing and scanning schemes. The analog pixel voltage can also be later converted on-chip to a digital equivalent and processed in various ways in the digital domain.

In silicon photomultiplier (SiPM) devices, on the other hand, the photon detection principle is different. Each SiPM pixel may be formed from a plurality of light sensing diodes (e.g., single-photon avalanche diodes). Each single-photon avalanche diode (SPAD) is biased far above its breakdown point, and when an incident photon generates an electron or hole, this carrier initiates an avalanche breakdown with additional carriers being generated. The avalanche multiplication may produce a current signal that can be easily detected by readout circuitry associated with the SiPM pixel. The avalanche process can be stopped (or quenched) by lowering the diode bias below its breakdown point. Each single-photon avalanche diode (SPAD) inside the SiPM pixel may therefore include a passive and/or active quenching circuit for halting the avalanche.

This concept can be used in two ways. First, the arriving photons may simply be counted (e.g., in low light level applications). Second, the SiPM pixels may be used to measure photon time-of-flight (ToF) from a synchronized light source to a scene object point and back to the sensor, which can be used to obtain a 3-dimensional image of the scene.

Figure 1:
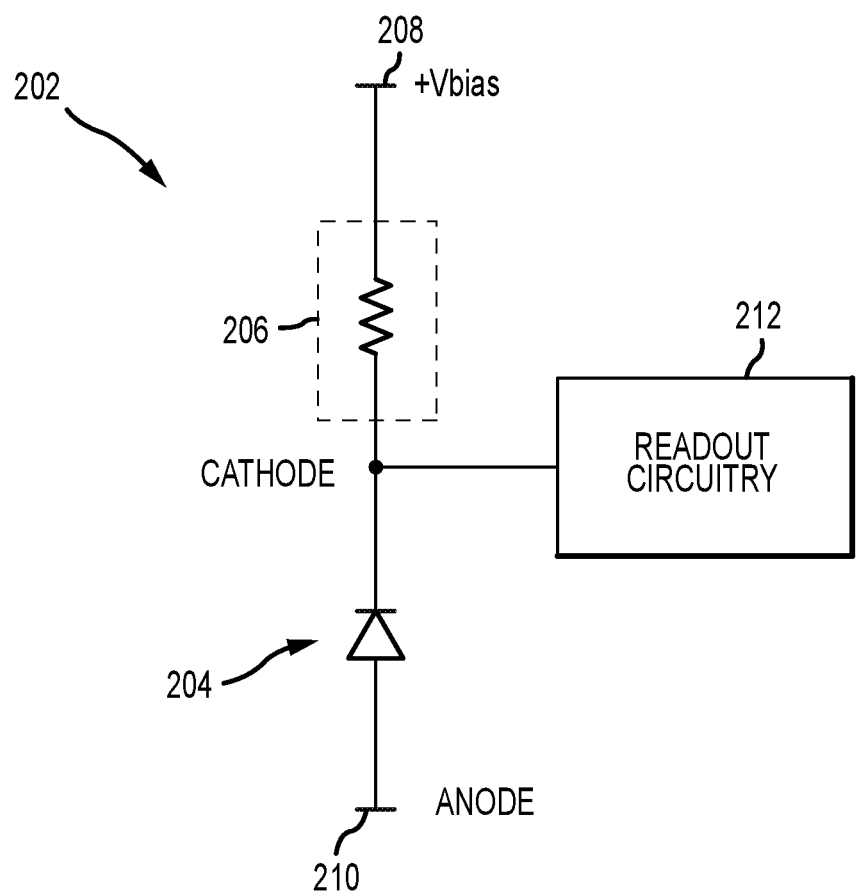
FIG. 1 is a circuit diagram showing an illustrative single-photon avalanche diode (SPAD) pixel in accordance with an embodiment.

FIG. 1 is a circuit diagram of an illustrative SPAD device 202. As shown in FIG. 1, SPAD device 202 includes a SPAD 204 that is coupled in series with quenching circuitry 206 between a first supply voltage terminal 210 (e.g., a ground power supply voltage terminal) and a second supply voltage terminal 208 (e.g., a positive power supply voltage terminal). In particular, SPAD device 202 includes a SPAD 204 having an anode terminal connected to power supply voltage terminal 210 and a cathode terminal connected directly to quenching circuitry 206. SPAD device 202 that includes SPAD 204 connected in series with a quenching resistor 206 is sometimes referred to collectively as a photo-triggered unit or "microcell." During operation of SPAD device 202, supply voltage terminals 208 and 210 may be used to bias SPAD 204 to a voltage that is higher than the breakdown voltage (e.g., bias voltage Vbias is applied to terminal 208). Breakdown voltage is the largest reverse voltage that can be applied to SPAD 204 without causing an exponential increase in the leakage current in the diode. When SPAD 204 is reverse biased above the breakdown voltage in this manner, absorption of a single-photon can trigger a short-duration but relatively large avalanche current through impact ionization.

Quenching circuitry 206 (sometimes referred to as quenching element 206) may be used to lower the bias voltage of SPAD 204 below the level of the breakdown voltage. Lowering the bias voltage of SPAD 204 below the breakdown voltage stops the avalanche process and corresponding avalanche current. There are numerous ways to form quenching circuitry 206. Quenching circuitry 206 may be passive quenching circuitry or active quenching circuitry.

Passive quenching circuitry may, without external control or monitoring, automatically quench the avalanche current once initiated. For example, FIG. 1 shows an example where a resistor component is used to form quenching circuitry 206. This is an example of passive quenching circuitry.

This example of passive quenching circuitry is merely illustrative. Active quenching circuitry may also be used in SPAD device 202. Active quenching circuitry may reduce the time it takes for SPAD device 202 to be reset. This may allow SPAD device 202 to detect incident light at a faster rate than when passive quenching circuitry is used, improving the dynamic range of the SPAD device. Active quenching circuitry may modulate the SPAD quench resistance. For example, before a photon is detected, quench resistance is set high and then once a photon is detected and the avalanche is quenched, quench resistance is minimized to reduce recovery time.

SPAD device 202 may also include readout circuitry 212. There are numerous ways to form readout circuitry 212 to obtain information from SPAD device 202. Readout circuitry 212 may include a pulse counting circuit that counts arriving photons. Alternatively or in addition, readout circuitry 212 may include time-of-flight circuitry that is used to measure photon time-of-flight (ToF). The photon time-of-flight information may be used to perform depth sensing. In one example, photons may be counted by an analog counter to form the light intensity signal as a corresponding pixel voltage. The ToF signal may be obtained by also converting the time of photon flight to a voltage. The example of an analog pulse counting circuit being included in readout circuitry 212 is merely illustrative. If desired, readout circuitry 212 may include digital pulse counting circuits. Readout circuitry 212 may also include amplification circuitry if desired.

The example in FIG. 1 of readout circuitry 212 being coupled to a node between diode 204 and quenching circuitry 206 is merely illustrative. Readout circuitry 212 may be coupled to terminal 208 or any desired portion of the SPAD device. In some cases, quenching circuitry 206 may be considered integral with readout circuitry 212.

Because SPAD devices can detect a single incident photon, the SPAD devices are effective at imaging scenes with low light levels. Each SPAD may detect the number of photons that are received within a given period of time (e.g., using readout circuitry that includes a counting circuit). However, as discussed above, each time a photon is received and an avalanche current initiated, the SPAD device must be quenched and reset before being ready to detect another photon. As incident light levels increase, the reset time becomes limiting to the dynamic range of the SPAD device (e.g., once incident light levels exceed a given level, the SPAD device is triggered immediately upon being reset).

Figure 2:
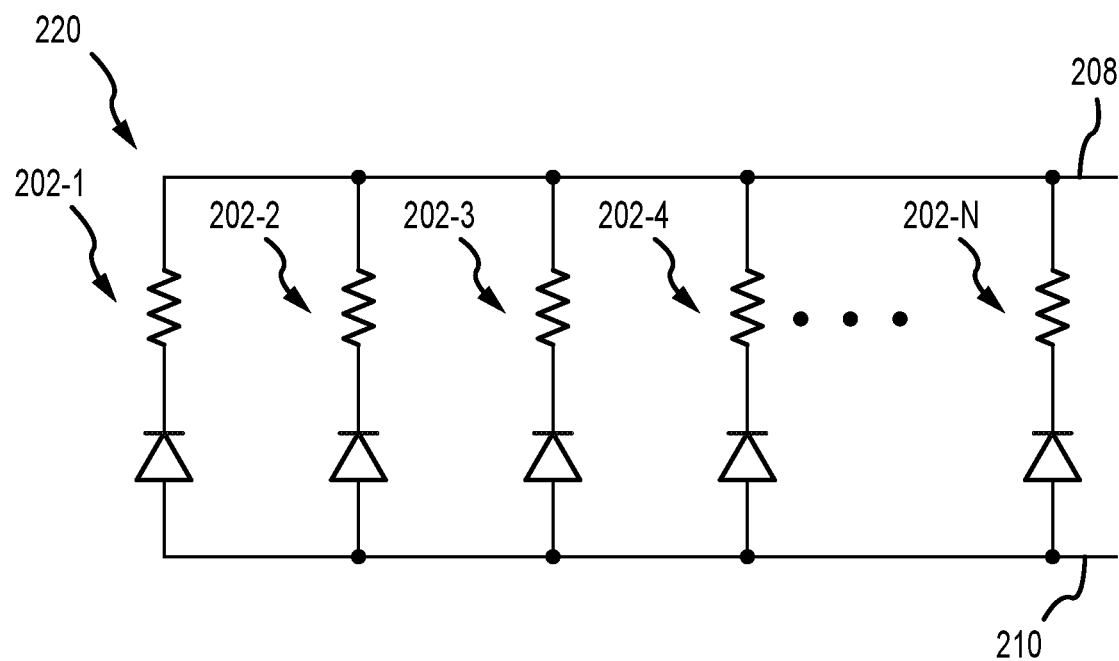
FIG. 2 is a diagram of an illustrative silicon photomultiplier in accordance with an embodiment.

Multiple SPAD devices may be grouped together to help increase dynamic range. FIG. 2 is a circuit diagram of an illustrative group 220 of SPAD devices 202. The group or array of SPAD devices may sometimes be referred to as a silicon photomultiplier (SiPM). As shown in FIG. 2, silicon photomultiplier 220 may include multiple SPAD devices that are coupled in parallel between first supply voltage terminal 208 and second supply voltage terminal 210. FIG. 2 shows N SPAD devices 202 coupled in parallel (e.g., SPAD device 202-1, SPAD device 202-2, SPAD device 202-3, SPAD device 202-4, . . . , SPAD device 202-N). More than two SPAD devices, more than ten SPAD devices, more than one hundred SPAD devices, more than one thousand SPAD devices, etc. may be included in a given silicon photomultiplier 220.

Each SPAD device 202 may sometimes be referred to herein as a SPAD pixel 202. Although not shown explicitly in FIG. 2, readout circuitry for the silicon photomultiplier 220 may measure the combined output current from all of SPAD pixels in the silicon photomultiplier. Configured in this way, the dynamic range of an imaging system including the SPAD pixels may be increased. Each SPAD pixel is not guaranteed to have an avalanche current triggered when an incident photon is received. The SPAD pixels may have an associated probability of an avalanche current being triggered when an incident photon is received. There is a first probability of an electron being created when a photon reaches the diode and then a second probability of the electron triggering an avalanche current. The total probability of a photon triggering an avalanche current may be referred to as the SPAD's photon-detection probability (PDP). Each SPAD device may also have an associated photon-detection efficiency (PDE) which is a product of fill factor and PDP. Grouping multiple SPAD pixels together in the silicon photomultiplier therefore allows for a direct measurement of the incoming incident light. For example, if a single SPAD pixel has a PDE of 50% and receives one photon during a time period, there is a 50% chance the photon will not be detected. With the silicon photomultiplier 220 of FIG. 2, chances are that two of the four SPAD pixels will detect the photon, thus improving the provided image data for the time period.

The example of FIG. 2 in which the plurality of SPAD pixels 202 share a common output in silicon photomultiplier 220 is merely illustrative. In the case of an imaging system including a silicon photomultiplier having a common output for all of the SPAD pixels, the imaging system may not have any resolution in imaging a scene (e.g., the silicon photomultiplier can just detect photon flux at a single point). It may be desirable to use SPAD pixels to obtain image data across an array to allow a higher resolution reproduction of the imaged scene. In cases such as these, SPAD pixels in a single imaging system may have per-pixel readout capabilities. Alternatively, an array of silicon photomultipliers (each including more than one SPAD pixel) may be included in the imaging system. The outputs from each pixel or from each silicon photomultiplier may be used to generate image data for an imaged scene. The array may be capable of independent detection (whether using a single SPAD pixel or a plurality of SPAD pixels in a silicon photomultiplier) in a line array (e.g., an array having a single row and multiple columns or a single column and multiple rows) or an array having more than ten, more than one hundred, or more than one thousand rows and/or columns.

While there are a number of possible use cases for SPAD pixels as discussed above, the underlying technology used to detect incident light is the same. All of the aforementioned examples of devices that use SPAD pixels may collectively be referred to as SPAD-based semiconductor devices. A silicon photomultiplier with a plurality of SPAD pixels (microcells) having a common output may be referred to as a SPAD-based semiconductor device. An array of SPAD pixels with per-pixel readout capabilities may be referred to as a SPAD-based semiconductor device. An array of silicon photomultipliers with per-silicon-photomultiplier readout capabilities may be referred to as a SPAD-based semiconductor device.

Figure 3:
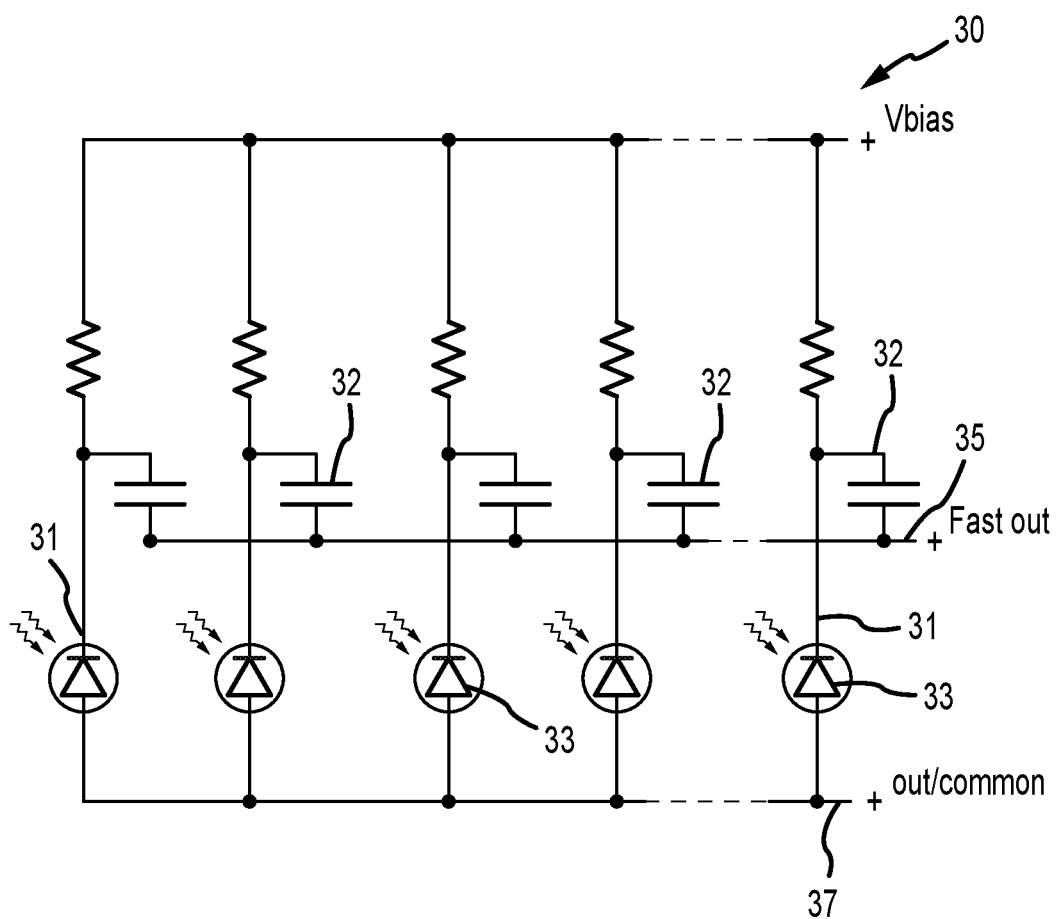
FIG. 3 is a schematic diagram of an illustrative silicon photomultiplier with a fast output terminal in accordance with an embodiment.

FIG. 3 illustrates a silicon photomultiplier 30. As shown in FIG. 3, SiPM 30 has a third terminal 35 which is capacitively coupled to each cathode terminal 31 in order to provide a fast readout of the avalanche signals from the SPADs 33. When then SPADs 33 emits a current pulse, part of the resulting change in voltage at the cathode 31 will be coupled via the mutual capacitance into the third ("fast") output terminal 35. Using the third terminal 35 for readout avoids the compromised transient performance resulting from the relatively large RC time constant associated with the biasing circuit that biases the top terminal of the quenching resistor.

Figure 4:
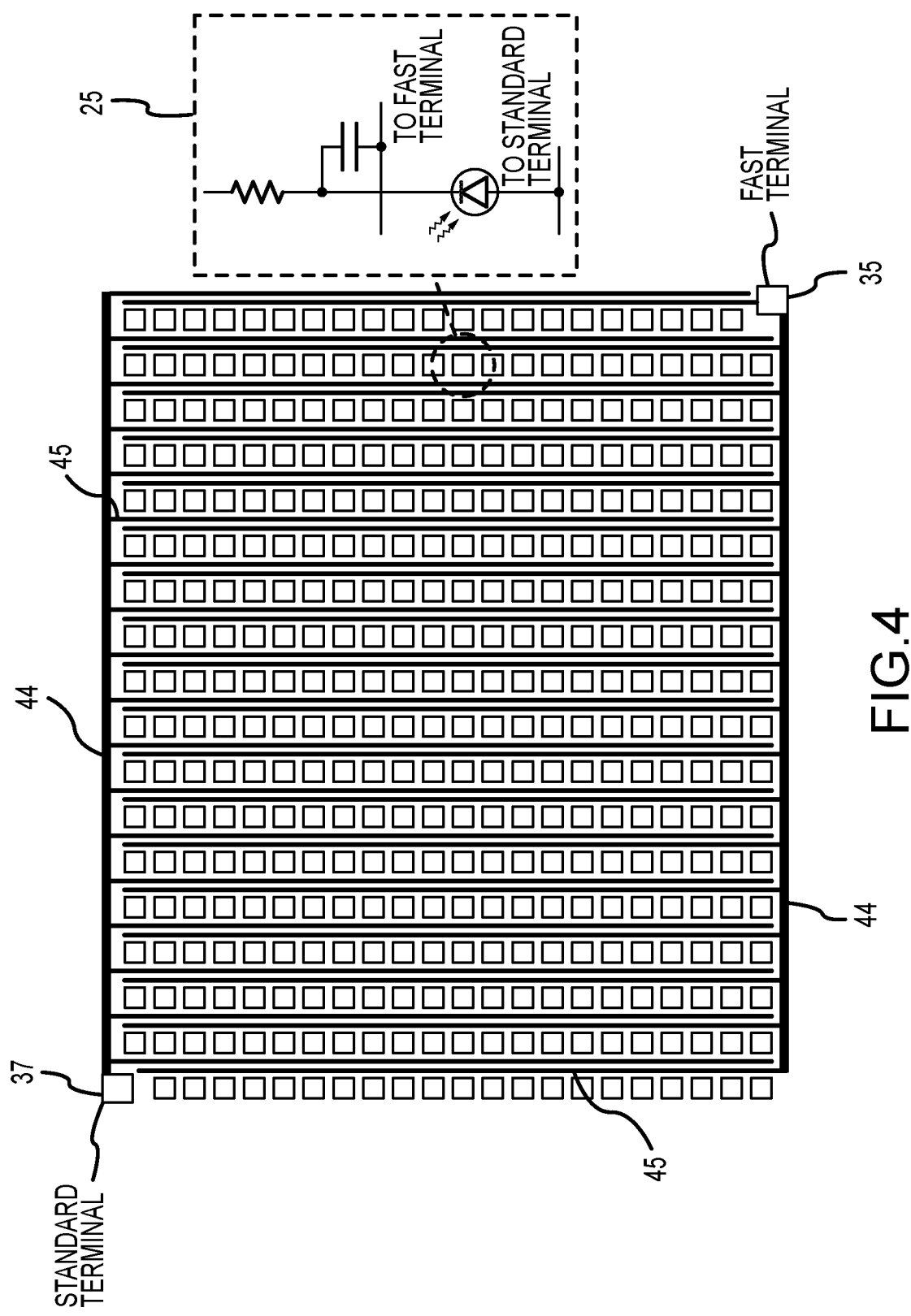
FIG. 4 is a diagram of an illustrative silicon photomultiplier comprising an array of microcells (SPAD diodes) in accordance with an embodiment.

It will be appreciated by those skilled in the art that silicon photomultipliers include major bus lines 44 and minor bus lines 45 as illustrated in FIG. 4. The minor bus liens 45 may connect directly to each individual microcell 25. The minor bus lines 45 are then coupled to the major bus lines 44 which connect to the bond pads associated with terminals 37 and 35. Typically, the minor bus lines 45 extend vertically between the columns of microcells 25, whereas the major bus lines 44 extend horizontally adjacent the outer row of the microcells 25.

Figure 5:
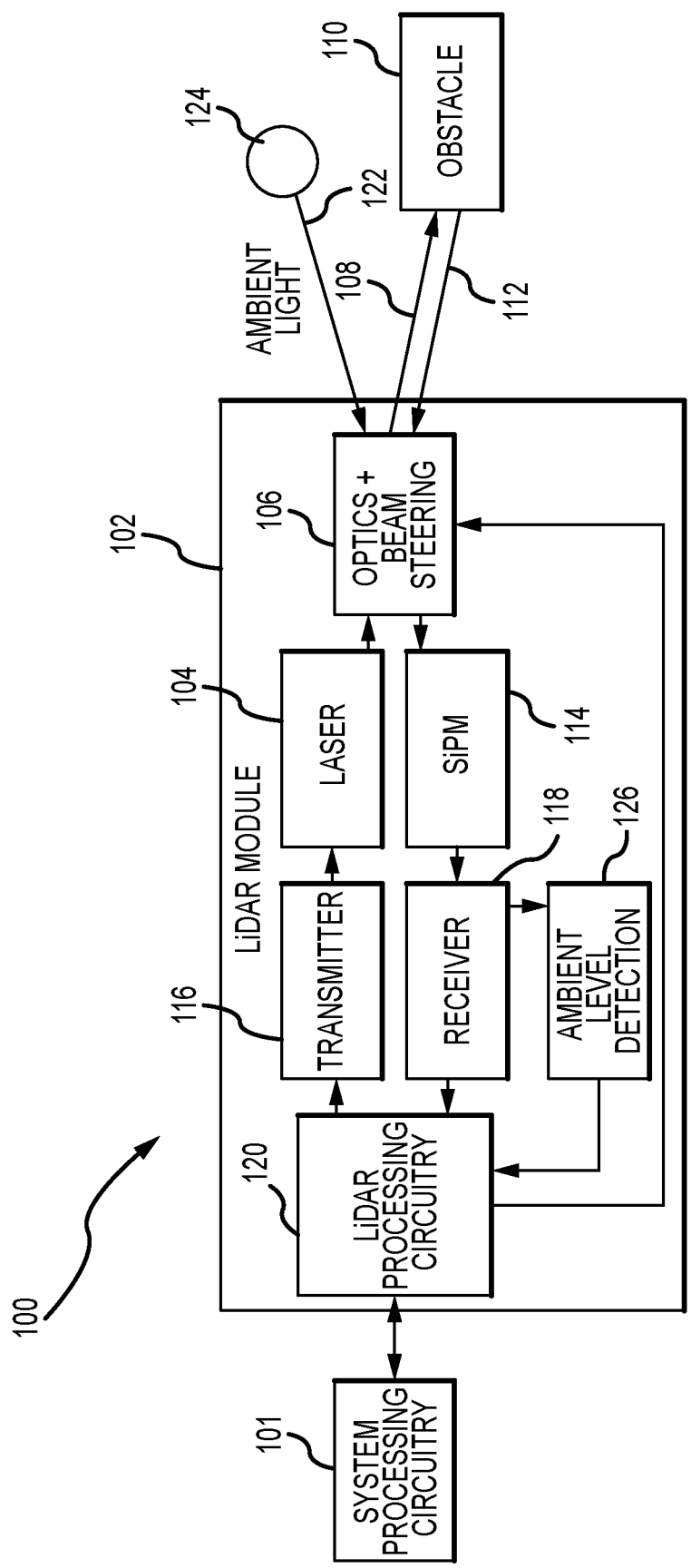
FIG. 5 is a schematic diagram of an illustrative imaging system that includes a SPAD-based semiconductor device in accordance with an embodiment.

FIG. 5 is a schematic diagram of an illustrative system that includes a light detection and ranging (LIDAR) imaging system. System 100 of FIG. 5 may be vehicle safety system (e.g., an active braking system or other vehicle safety system), a surveillance system, a medical imaging system, a general machine vision system, or any other desired type of system.

System 100 may provide a user with numerous high-level functions. In a computer or advanced cellular telephone, for example, a user may be provided with the ability to run user applications. To implement these functions, the imaging system may include input-output devices such as keypads, buttons, input-output ports, joysticks, and displays. Additional storage and processing circuitry such as volatile and nonvolatile memory (e.g., random-access memory, flash memory, hard drives, solid state drives, etc.), microprocessors, microcontrollers, digital signal processors, application specific integrated circuits, and/or other processing circuits may also be included in the imaging system.

Input-output devices may include output devices that work in combination with the SPAD-based semiconductor device. For example, a light-emitting component (such as a laser 104) may be included in the imaging system to emit light (e.g., infrared light or light of any other desired type).

System 100 includes a LIDAR-based imaging system 102, sometimes referred to as a LIDAR module. LIDAR module 102 may be used to capture images of a scene and measure distances to obstacles in the scene.

In a vehicle safety system, information from the LIDAR module may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), a pedestrian detection system, etc. In at least some instances, a LIDAR module may form part of a semi-autonomous or autonomous self-driving vehicle.

LIDAR module 102 may include a laser 104 that emits light 108 to illuminate an obstacle 110. The laser may emit light 108 at any desired wavelength (e.g., infrared light, visible light, etc.). Optics and beam-steering equipment 106 may be used to direct the light beam from laser 104 towards obstacle 110. Light 108 may illuminate obstacle 110 and return to the LIDAR module as a reflection 112. One or more lenses in optics and beam-steering 106 may focus the reflected light 112 onto silicon photomultiplier (SiPM) 114 (sometimes referred to as SiPM sensor 114 or SPAD-based semiconductor device 114).

Silicon photomultiplier 114 is a single-photon avalanche diode (SPAD) device. In other words, silicon photomultiplier 114 may include a plurality of single-photon avalanche diodes (microcells). The SPAD pixels may be used to measure photon time-of-flight (ToF) from a synchronized light source (e.g., laser 104) to a scene object point and back to the sensor, which can be used to obtain a 3-dimensional image of the scene.

The SPAD-based semiconductor device 114 may have any number of SPAD pixels (e.g., two, more than two, more than ten, more than one hundred, more than one thousand, more than one million, etc.). In some SPAD-based semiconductor devices, each SPAD pixel may be covered by a respective color filter element and/or microlens. The SPAD-based semiconductor device 114 may optionally include additional circuitry such as logic gates, digital counters, time-to-digital converters, bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

The LIDAR module 102 may also include a transmitter 116 and receiver 118. LIDAR processing circuitry 120 may control transmitter 116 to emit light from laser 104 (e.g., transmitter 116 may be a driver for the laser). Receiver 118 may include one or more comparators that are configured to determine the magnitude of one or more signals received by the silicon photomultiplier. The LIDAR processing circuitry 120 may receive data from receiver 118 (and SiPM 114). Based on the data from SiPM 114, LIDAR processing circuitry 120 may determine a distance to the obstacle 110. The LIDAR processing circuitry 120 may communicate with system processing circuitry 101. System processing circuitry 101 may take corresponding action (e.g., on a system-level) based on the information from LIDAR module 102.

LIDAR processing circuitry 120 and/or system processing circuitry 101 may be used to perform image processing functions such as automatic focusing functions, depth sensing, data formatting, adjusting white balance and exposure, implementing video image stabilization, face detection, etc. For example, during automatic focusing operations, processing circuitry may process data gathered by the SPAD pixels to determine the magnitude and direction of lens movement (e.g., movement of a lens in optics and beam steering 106) needed to bring an object of interest into focus. Processing circuitry may process data gathered by the SPAD pixels to determine a depth map of the scene. Receiver 118, LIDAR processing circuitry 120, ambient level detection circuitry 126, and/or system processing circuitry may all collectively, in some subset, and/or individually be referred to as processing circuitry.

Performance of the LIDAR based imaging system 102 may be impacted by ambient light levels. As shown in FIG. 5, SiPM 114 may receive ambient light 122 from ambient light source 124 in addition to reflections 112 from obstacle 110. The ambient light 122 affects the amount of light sensed by SiPM 114. This noise may adversely affect performance of the LIDAR module.

To correct for the ambient light noise, LIDAR module 102 may include ambient light level detection circuitry 126 (sometimes referred to as ambient level detection circuitry 126, ambient level detection 126, etc.). The ambient level detection circuitry 126 may extract the ambient light level from the scene. The ambient light level may then be used by LIDAR processing circuitry 120 to set an object detection threshold.

Ambient level detection circuitry 126 may monitor the amplitude of all pulses detected by SiPM 114. Based on a recent history of pulse amplitudes, the ambient level detection circuitry estimates the ambient level and provides the ambient level to LiDAR processing circuitry 120. The LiDAR system can use this information to properly set the threshold for discrimination of valid pulse amplitude and thus more reliably detect targets. In other words, the threshold is used to determine whether a received pulse is caused by light from ambient light source 124 (amplitudes below the threshold) or a reflection from obstacle 110 (amplitudes above the threshold).

The principle of operation of the ambient light detection circuitry 126 is monitoring count rate (CR) of all SiPM pulses discriminated by a predefined set of threshold levels that distinguish whether the SiPM pulses originate from ambient light or a laser pulse (from laser 104). Count Rate (CR) of uncorrelated ambient light pulses will be significantly higher than the count rate of pulses correlated to laser 104 (e.g., reflections from obstacle 110 originating at laser 104). As a SiPM sensor sensitivity can go down to 1 photon (PE) it is practical to express SiPM pulse amplitude as well as threshold levels in terms of PE. The signal magnitude (e.g., a voltage or current magnitude) associated with 1 photon may be predetermined for the particular system and may be stored within the system as a known value.

The system may use at least 2 adjustable thresholds in the ambient light level detection circuitry. With 2 adjustable thresholds, the ambient light level detection circuitry can distinguish count rates below and above lower and higher threshold levels respectively. The system may adjust the thresholds by one PE intervals to find a level where the count rate below the lower threshold is significantly higher than the count rate above the higher threshold. The level in between these two thresholds is the approximate ambient light threshold. The example of using two thresholds is merely illustrative. Using more threshold levels may increase the accuracy of setting the threshold level.

Figure 6:
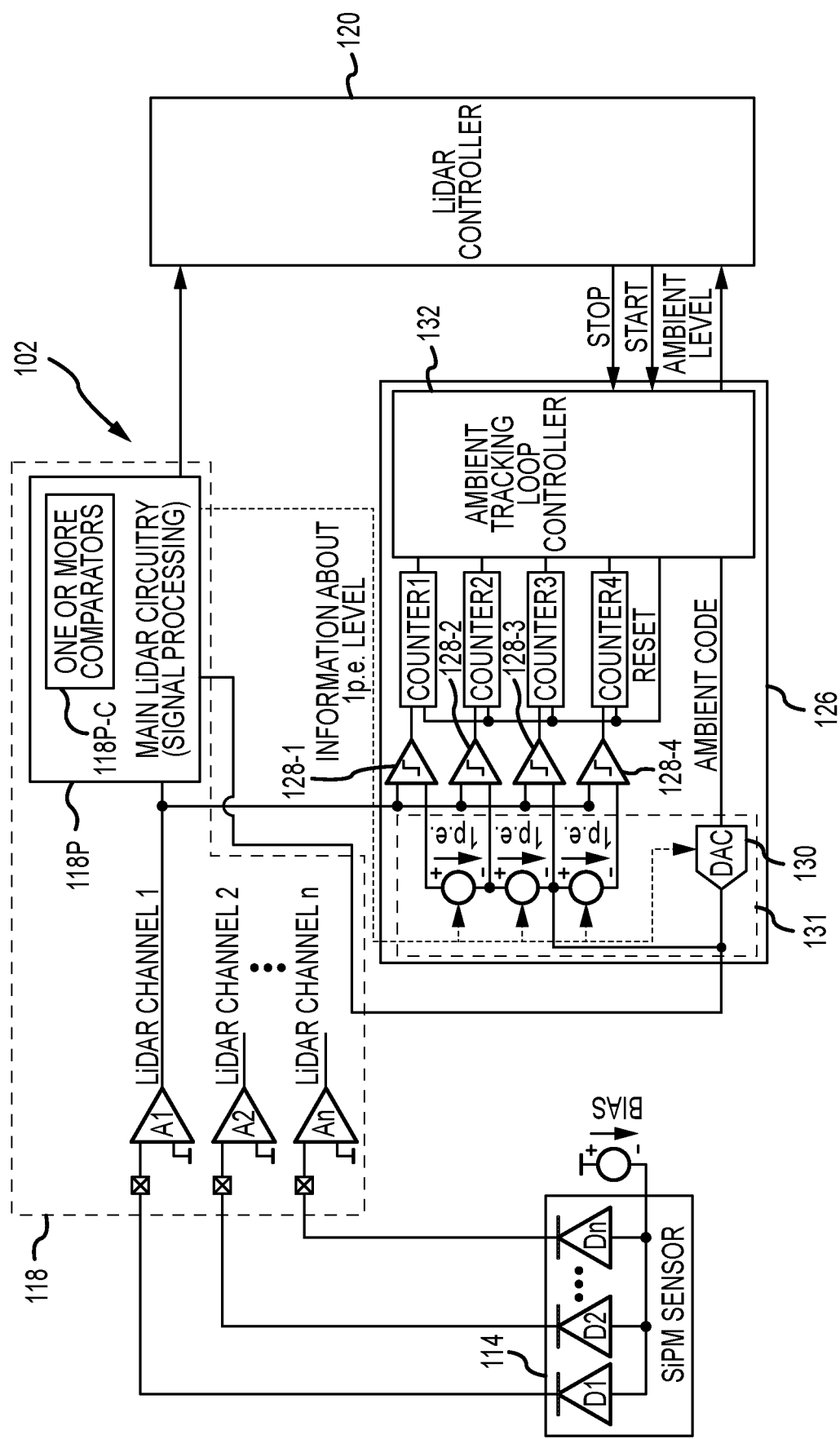
FIG. 6 is a schematic diagram of an illustrative light detection and ranging (LIDAR) module that includes ambient light level detection circuitry with voltage comparators in accordance with an embodiment.

FIG. 6 is a schematic diagram showing an illustrative diagram of a LIDAR module with ambient light detection circuitry. A LIDAR module may include multiple LIDAR channels. A channel may refer to the output of a respective subset of SPADs in the SiPM sensor. As previously mentioned, all SPADs on the SiPM sensor may have a common output (e.g., the sensor may have a single channel). In other embodiments, respective groups of SPADs may have respective outputs (e.g., the sensor may have different channels). The groups of SPADs associated with each different channel may be referred to as silicon photomultiplier sensor pixels or may simply be referred to as separate silicon photomultipliers on the silicon photomultiplier sensor.

Each LIDAR channel may have a corresponding amplifier in receiver 118. As shown, channel 1 has an amplifier A1, channel 2 has an amplifier A2, etc. The outputs of the amplifiers may be coupled to main LIDAR circuitry (signal processing circuitry) 118P. The inputs and outputs of the amplifier may both be referred to as output signals from silicon photomultiplier 114. In other words, the amplified signal from sensor 114 may still be referred to as an output signal from sensor 114. The signal processing circuitry may include one or more comparators 118P-C for identifying the magnitude of the signals from the amplifiers. Each comparator may have a corresponding reference signal of a unique magnitude. The outputs of the comparators indicate whether the signal from SPAD-based semiconductor device 114 is greater or less than the corresponding reference signals. These comparator outputs may be used (e.g., by LIDAR controller 120) to identify the approximate magnitude of the output signals. One or more digital-to-analog converters (DAC) may be used to provide the reference signals for signal processing circuitry 118P. If desired, a DAC used in ambient light detection circuitry 126 may also provide a reference signal to one or more comparator(s) in signal processing circuitry 118P.

A reference signal for signal processing circuitry 118P may be set to a level equal to the ambient light level determined by ambient light detection circuitry 126. With this arrangement, pulses originating from the laser (e.g., reflected pulses for the LIDAR system) may be detected by the comparator. Pulses originating from ambient light may be ignored. The reference signal may optionally be set higher than the ambient light level by some amount (to provide additional buffer between the detection threshold and the ambient light level).

Receiver 118 may also optionally include a pole zero compensation and DC offset cancellation block. The pole zero compensation and DC offset cancellation block may be used to shape the sensor signal and cancel DC offset.

For simplicity, in FIG. 6, ambient light detection circuitry 126 for only one channel is shown. However, it should be understood that each channel may have respective ambient light detection circuitry 126. In some cases, multiplexing circuitry may be used to selectively connect the ambient light detection circuitry to one of multiple LIDAR output channels.

In the example of FIG. 6, the ambient light detection circuitry 126 includes four comparators (128-1, 128-2, 128-3, and 128-4). Ambient light detection circuitry 126 may include reference signal generating circuitry 131 that is used to generate reference signals for the comparators. The comparators 128-1, 128-2, 128-3, and 128-4 may be voltage comparators or current comparators. If the comparators are voltage comparators, each comparator may receive a reference signal from circuitry 131 that differs by 1 PE of voltage. If the comparators are current comparators, each comparator may receive a reference signal from circuitry 131 that differs by 1 PE of current.

In FIG. 6, comparators 128-1, 128-2, 128-3, and 128-4 are voltage comparators. In this example, reference signal generating circuitry 131 includes digital-to-analog converter (DAC) 130. Digital-to-analog converter 130 sets a reference input (e.g., a reference voltage) for each comparator. The reference input for each comparator may differ by 1 PE. This example is merely illustrative. The reference inputs may differ by varying intervals or uniform intervals of any desired magnitude. In one example, the reference input for comparator 128-1 may be 3.5 PE, the reference input for comparator 128-2 may be 2.5 PE, the reference input for comparator 128-3 may be 1.5 PE, and the reference input for comparator 128-4 may be 0.5 PE. Each comparator also receives the output from the silicon photomultiplier (e.g., a sensor input) at the other comparator input. Each comparator has an associated counter that counts how many times the sensor input exceeds the reference input. The associated counters may be digital counters or analog counters.

Consider an example where the average ambient light level is about 2.0 PE. Counter 1 and counter 2 will have a low number of counts (because the sensed light will only exceed 2.5 PE and 3.5 PE when an obstacle detection occurs). Counters 3 and 4 will have a high number of counts (because the ambient light level will regularly exceed 1.5 PE and 0.5 PE and therefore trigger counters 3 and 4).

The ambient light level detection controller 132 may reset the counters when counter 4 (e.g., the counter associated with the lowest threshold) overflows or when a monitoring cycle of a given length (e.g., of time, of counts from counter 4, etc.) has concluded. Ambient light level detection controller 132 may output the ambient light level to LIDAR processing circuitry 120 (sometimes referred to as LIDAR controller 120). If the number of counts on counter 2 is low and the number of counts on counter 3 is high, ambient tracking loop controller 132 may determine that the ambient light level is between the reference input to comparator 128-2 and the reference input to comparator 128-3. One or more thresholds may be used to identify a 'low' number of counts and a 'high' number of counts. The thresholds may be predetermined and unchanging or may optionally be varied by reference signal generating circuitry 131 based on real-time conditions.

As one example, ambient tracking loop controller 132 may identify a count as being low if the count is below a first threshold (e.g., less than 10 counts, less than 8 counts, less than 5 counts, less than 3 counts, etc.). Ambient tracking loop controller 132 may identify a count as being high if the count is above a second threshold (e.g., having the same magnitude or a different magnitude than the first threshold). The second threshold may be more than 3 counts, more than 5 counts, more than 10 counts, more than 15 counts, etc.

If counter 2 counts a large number of counts (e.g., in a scenario in which the ambient light level increases to about 3.0 PE), the ambient code may be increased by one and controller 132 may restart the counting. In this example, the new threshold levels (for the comparators) may be 4.5 PE, 3.5 PE, 2.5 PE, and 1.5 PE. Similarly, if counter 3 counts a small number, the ambient code may be decreased.

The ambient code (and corresponding reference signals provided to the comparators) may be updated by 1 PE between cycles, 2 PE between cycles, more than 2 PE between cycles, etc. For example, consider a scenario in which the reference inputs to the comparators are 3.5 PE, 2.5 PE, 1.5 PE, and 0.5 PE for a given monitoring cycle. If counter 1 and counter 2 have a large number of counts (e.g., in a scenario in which the actual ambient light level is at about 4.0 PE), the ambient code may be increased by two and controller 132 may restart the counting. In this example, the new threshold levels may be 5.5 PE, 4.5 PE, 3.5 PE, and 2.5 PE. With these new reference values, counters 1 and 2 will have low counts and counters 3 and 4 will have high counts. The ambient light level is therefore determined as being between 3.5 PE and 4.5 PE.

LIDAR controller 120 may receive signals from signal processing circuitry 118P in receiver 118 (e.g., signals indicative of the pulse magnitudes from the SPAD-based semiconductor device 114). LIDAR controller 120 may send stop and start control signals to the ambient tracking loop controller. LIDAR controller 120 may also receive the determined ambient level from ambient tracking loop controller 132.

As shown in FIG. 6, the output form DAC 130 may optionally be provided to signal processing circuitry 118P. In this way, signal processing circuitry 118P may use the DAC output to determine an appropriate threshold for discriminating between pulses form ambient light and pulses from reflected laser light.

Figure 7:
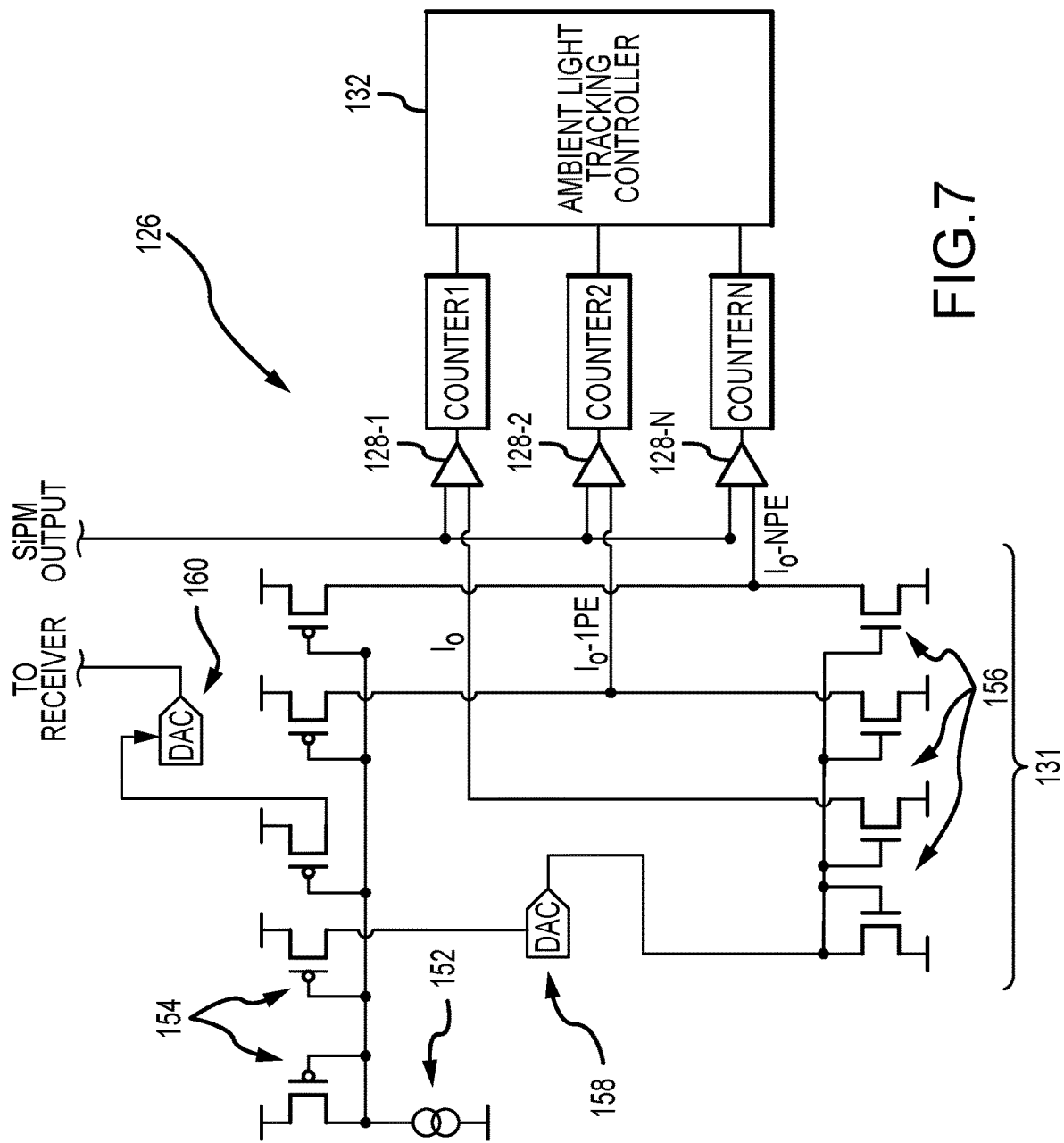
FIG. 7 is a schematic diagram of illustrative ambient light level detection circuitry with current comparators in accordance with an embodiment.

FIG. 7 is a schematic diagram of illustrative ambient level detection circuitry 126 that is formed with current comparators. The ambient level detection circuitry 126 in FIG. 7 may be used as the ambient level detection circuitry in FIG. 6 if desired. As shown in FIG. 7, a series of current comparators 128-1, 128-2, . . . , 128-N is included. Each comparator has a corresponding counter. Each counter is coupled to ambient light tracking controller 132.

Each current comparator receives an output from the SPAD-based semiconductor device 114 at one terminal. At the other terminal, each current comparator receives a reference current. The reference current starts at some initial value $I_O$ for comparator 128-1. For each subsequent comparator, the magnitude of the current is reduced by one PE (e.g., $I_O$–1PE for comparator 128-2, $I^O$–NPE for comparator 128-N).

The ambient light level detection circuitry 126 includes a current source 152. A plurality of pMOS (p-type metal-oxide-semiconductor) devices 154 are coupled to the current supply. The ambient light level detection circuitry 126 also includes a plurality of nMOS (n-type metal-oxide-semiconductor) devices 156. Additional devices are coupled to each comparator reference input to progressively lower the reference current provided to the comparators. The supply terminals for the devices are controlled to achieve the desired current drop between each respective comparator in the ambient light level detection circuitry. As shown in FIG. 7, a first digital-to-analog converter (DAC) 158 is coupled between the pMOS devices and the nMOS devices.

FIG. 7 also shows how a second digital-to-analog converter (DAC) 160 may be included that provides an output to a LIDAR receiver (e.g., signal processing circuitry 118P of receiver 118 in FIG. 6). The output from DAC 160 may be used as a reference signal for a comparator in the receiver.

FIGS. 8A and 8B are graphs of detected PE over time. FIG. 8A shows a scenario with strong ambient light. As shown, there are regularly counts of up to 5 PE. However, these counts are still lower than the peak 142 associated with object detection. In FIG. 8B, the ambient light level is lower. As shown, there are regularly counts of up to 2 PE. Again, these are lower than the peak 142 associated with object detection.

Figure 9:
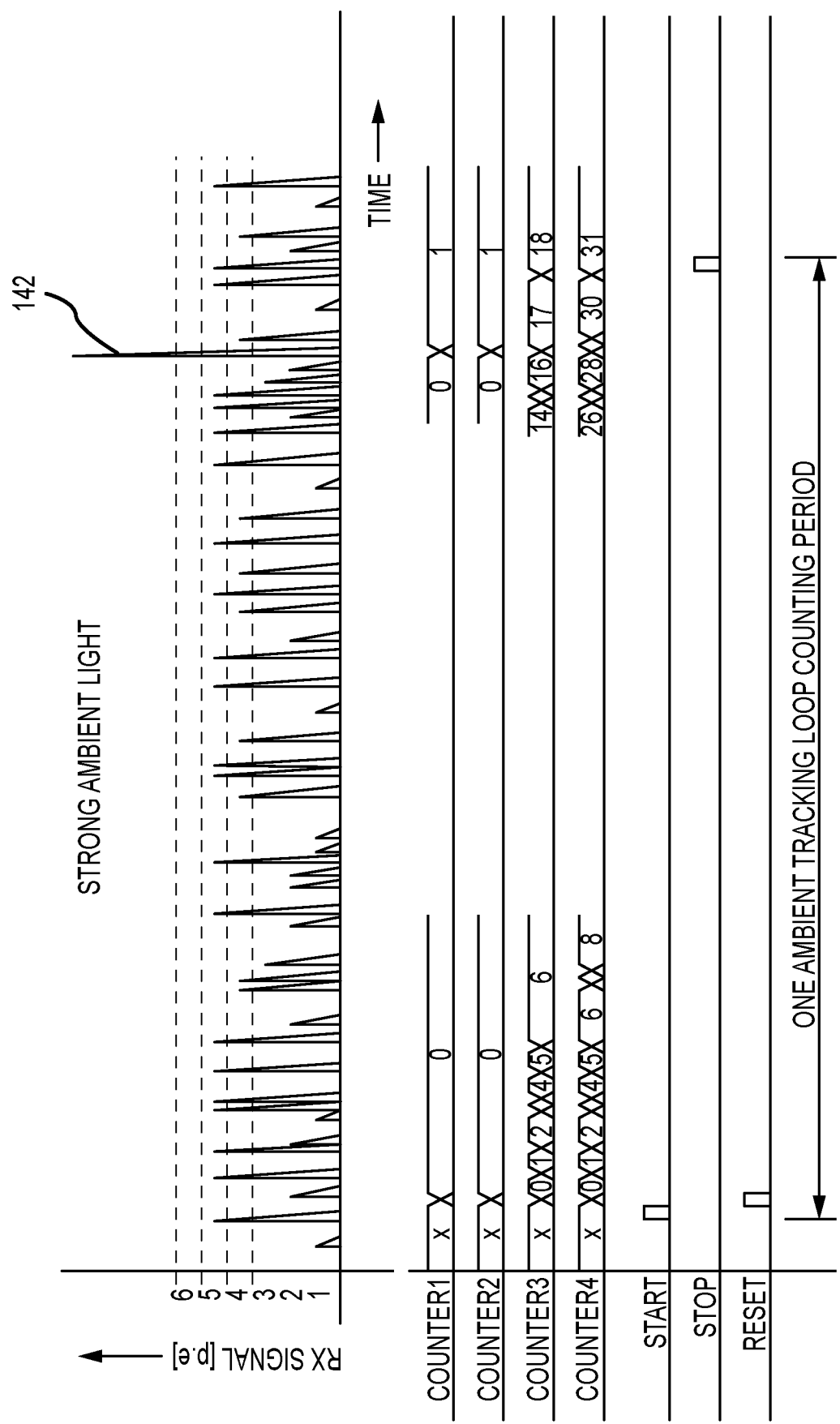
FIG. 9 is a graph showing the count of counters in ambient light level detection circuitry over one ambient tracking loop in accordance with an embodiment.

FIG. 9 is a diagram showing example measurement waveforms for a LIDAR module including ambient light level detection circuitry. In this example, the thresholds of counters 1, 2, 3, and 4 in FIG. 6 are set to 6.5 PE, 5.5 PE, 4.5 PE, and 3.5 PE, respectively. As shown, the count only exceeds 5.5 PE during obstacle detection peak 142. Therefore, counters 1 and 2 remain at 0 until peak 142 and have a count of 1 after peak 142. Counters 3 and 4, meanwhile, are frequently triggered by the ambient light peaks. Counter 3 concludes the ambient tracking loop with a count of 18 whereas counter 4 concludes ambient tracking loop with a count of 31. After one ambient tracking loop counting period, the counters may optionally be reset.

In this example, the results from counters 1 and 2 may be classified as being low (e.g., below a threshold) whereas the results from counters 3 and 4 may be classified as being high (e.g., above a threshold). Therefore, ambient tracking loop controller 132 may determine that the ambient light level is between the reference levels for counters 2 and 3 (e.g., between 4.5PE and 5.5PE).

To summarize, this LIDAR module is capable of monitoring the height of SiPM pulses and is able to determine the ambient light level by searching for the highest pulses that are present with sufficiently large count rate. In contrast, the count rate of pulses (having higher amplitude) correlated to the laser is significantly lower. When instructed, the device runs a monitoring cycle of SiPM pulses and counts them based on their height. The device can run this monitoring cycle as needed and can use monitoring of multiple levels to know how to adjust in case there is a change of ambient light levels. The monitoring cycle can have a fixed length of time, a fixed number of counts, or can be done as a moving average. The monitoring cycle may be performed concurrently with measurement cycles for the LIDAR system. In other words, while the LIDAR system is transmitting laser pulses to identify objects in the scene, the ambient light level circuitry may simultaneously be monitoring the pulses from the silicon photomultiplier to identify ambient light levels.

These techniques allow the LIDAR system to dynamically adjust threshold levels to discriminate targets (e.g., identify obstacles) under a wide and unpredictable range of illumination conditions.

The foregoing is merely illustrative of the principles of this invention and various modifications can be made by those skilled in the art. The foregoing embodiments may be implemented individually or in any combination.

What is claimed is:

1. A system, comprising:
    a semiconductor device that includes a single-photon avalanche diode;
    signal processing circuitry that comprises a first comparator; and
    ambient light level detection circuitry that comprises a plurality of comparators that are different than the first comparator and a plurality of counters, wherein each counter is coupled to a corresponding comparator of the plurality of comparators, wherein the first comparator and the plurality of comparators receive a common output signal from the semiconductor device, wherein the common output signal is an analog output signal, and wherein the ambient light level detection circuitry is configured to determine an ambient light level based on the common output signal.

2. The system defined in claim 1, wherein each one of the plurality of comparators is configured to receive the common output signal at a respective first input terminal and a respective reference signal at a respective second input terminal.

3. The system defined in claim 2, wherein the respective reference signal at each second input terminal has a unique magnitude.

4. The system defined in claim 2, wherein each one of the plurality of comparators is a voltage comparator and wherein the respective reference signal at each second input terminal has a unique voltage magnitude.

5. The system defined in claim 2, wherein each one of the plurality of comparators is a current comparator and wherein the respective reference signal at each second input terminal has a unique current magnitude.

6. The system defined in claim 1, wherein the ambient light level detection circuitry comprises a controller that is configured to determine the ambient light level based on a respective count at each one of the plurality of counters.

7. The system defined in claim 1, further comprising:
    a laser configured to emit light, wherein the semiconductor device is configured to receive a reflected version of the light from the laser and wherein the signal processing circuitry is configured to use the ambient light level detected by the ambient light level detection circuitry to discriminate between output signals caused by ambient light and output signals caused by the reflected version of the light from the laser.

8. A system operable with a light source that is configured to emit light, the system comprising:
    a semiconductor device that includes a single-photon avalanche diode, wherein the semiconductor device is configured to be exposed to both ambient light and a reflected version of the light;
    ambient light level detection circuitry configured to determine a level of the ambient light based on an output signal from the semiconductor device, wherein the ambient light level detection circuitry comprises a plurality of comparators that receive reference signals with unique magnitudes; and
    processing circuitry comprising an additional comparator that is configured to discriminate between the ambient light and the reflected version of the light based on the output signal and the level determined by the ambient light level detection circuitry, wherein the ambient light level detection circuitry is configured to provide a reference signal to the additional comparator that is based on the level determined by the ambient light level detection circuitry.

9. The system defined in claim 8, wherein the ambient light level detection circuitry further comprises a plurality of counters and wherein each counter is configured to count a number of times the output signal exceeds the respective reference signal for a respective comparator of the plurality of comparators.

10. The system defined in claim 9, wherein the ambient light level detection circuitry is configured to determine the level of the ambient light based on the number counted by each counter after an ambient light tracking cycle is complete.

11. The system defined in claim 8, wherein the plurality of comparators comprises a plurality of voltage comparators.

12. The system defined in claim 8, wherein the plurality of comparators comprises a plurality of current comparators.

13. A light detection and ranging (LIDAR) imaging system comprising:
    a silicon photomultiplier;
    a plurality of comparators having respective first and second inputs, wherein each first input is configured to receive a common output signal from the silicon photomultiplier;
    reference signal generating circuitry configured to provide different reference signals to each one of the second inputs; and
    a plurality of counters each configured to count a number of times the common output signal exceeds the respective reference signal for a respective comparator.

14. The LIDAR imaging system defined in claim 13, further comprising:
    a receiver configured to receive the common output signal from the silicon photomultiplier; and
    LIDAR processing circuitry coupled to the receiver and the plurality of counters.

15. The LIDAR imaging system defined in claim 13, wherein the different reference signals each have a magnitude that differs by one photon level from magnitudes of adjacent reference signals.

16. The system defined in claim 8, wherein the unique magnitudes for the reference signals each have a magnitude that differs by one photon level from magnitudes of adjacent reference signals.

17. The system defined in claim 16, wherein the ambient light level detection circuitry is configured to receive information about one photon level from the processing circuitry.

18. The system defined in claim 1, wherein the ambient light level detection circuitry comprises a plurality of p-type metal-oxide-semiconductor devices coupled to a current supply.

19. The system defined in claim 18, wherein each one of the plurality of comparators is configured to receive the common output signal at a respective first input terminal and a respective reference signal at a respective second input terminal, wherein each one of the plurality of comparators is a current comparator, wherein the respective reference signal at each second input terminal has a unique current magnitude, wherein the ambient light level detection circuitry comprises a plurality of n-type metal-oxide-semiconductor devices, and wherein the plurality of current comparators is coupled to progressively more n-type metal-oxide-semiconductor devices to progressively lower the magnitude of the respective reference signal at each second input terminal.

* * * * *